(12) United States Patent
Thetford et al.

(10) Patent No.: US 6,787,600 B1
(45) Date of Patent: Sep. 7, 2004

(54) POLYESTER DISPERSANTS

(75) Inventors: Dean Thetford, Manchester (GB); Ian Donald Maxwell, Manchester (GB); Lindsay Anne Slater, Grangemouth (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/088,305

(22) PCT Filed: Aug. 31, 2000

(86) PCT No.: PCT/GB00/03335
§ 371 (c)(1), (2), (4) Date: Aug. 20, 2002

(87) PCT Pub. No.: WO01/21298
PCT Pub. Date: Mar. 29, 2001

(30) Foreign Application Priority Data

Sep. 18, 1999 (GB) .............................. 9922039

(51) Int. Cl.⁷ .............................. C08L 79/00
(52) U.S. Cl. ....................... 524/599; 525/63
(58) Field of Search .............................. 524/599; 525/63

(56) References Cited

U.S. PATENT DOCUMENTS 5,700,355 A * 12/1997 Prough ....................... 162/246
6,194,539 B1 * 2/2001 Matsui ........................ 528/354
6,197,877 B1 * 3/2001 Thetford et al. ............. 524/599
6,583,213 B1 * 6/2003 Fawkes et al. .............. 524/539
6,599,947 B2 * 7/2003 Thetford ....................... 516/31

FOREIGN PATENT DOCUMENTS

| EP | 0713894 | 5/1996 |
|---|---|---|
| WO | WO 94/21368 | 9/1994 |
| WO | WO 98/19784 | 5/1998 |

* cited by examiner

*Primary Examiner*—Jeffrey Mullis
(74) *Attorney, Agent, or Firm*—Pillsbury Winthrop LLP

(57) ABSTRACT

A dispersant which comprises a polyamine (eg polyallylamine) or polyimine (eg polyethyleneimine) backbone chain containing side chains of two or more different types of polyester chain wherein at least one type of polyester chain is derivable from one or more hydroxy carboxylic acids all of which contain a $C_{1-8}$-alkylene group or lactone thereof such as ε-caprolactone and/or δ-valerolactone and at least one other type of polyester chain derivable from one or more hydroxy carboxylic acids wherein at least one of the hydroxy carboxylic acids contains a $C_{8-30}$-alkylene chain (e.g 12-hydroxystearic acid) or a $C_{8-30}$-alkenylene chain (eg ricinoleic acid) or lactone thereof.

19 Claims, No Drawings

POLYESTER DISPERSANTS

CROSS REFERENCE TO RELATED APPLICATIONS

This application is a national phase application based on PCT/GB00/03335, filed Aug. 31, 2000, and which further claims priority from British Application No. 9922039.4 filed Sep. 18, 1999. These applications in their entirety are incorporated herein by reference.

The present invention relates to polyester dispersants comprising a polyamine or polyimine chain containing two or more different types of polyester chain attached to the polyamine or polyimine chains.

WO 94/21368 discloses a dispersant comprising a polyethyleneimine residue carrying a plurality of poly(carbonylalkyleneoxy) chains each chain containing a plurality of repeat units derivable from 6-hydroxyhexanoic acid and at least one other hydroxycarboxylic acid selected from ricinoleic acid, 12-hydroxystearic acid, 12-hydroxydodecanoic acid, 5-hydroxydodecanoic acid, 5-hydroxydecanoic acid and 4-hydroxydecanoic acid. These dispersants were shown to be particularly effective when dispersing pigments in non-polar solvents such as xylene.

WO 98/19784 discloses a dispersant which contains a polyester chain derived from optionally alkyl substituted ε-caprolactone and δ-valerolactone attached via amide or salt groups to a polyamine or polyimine backbone chain such as polyallylamine or polyalkyleneimine, for example polyethyleneimine. These dispersants are particularly effective for dispersing pigments in polar organic liquids such as butanol and methoxy propylacetate.

EP 713 894 discloses dispersants which contain a polyester chain which is attached to a polyamine or polyimine backbone chain via a Michaels addition reaction. The polyester chain contains oxy-$C_{3-10}$-alkylene carbonyl groups. These dispersants are effective for dispersing pigments in non-polar liquids such as xylenes and in polar organic liquids such as alcohols and ketones.

None of these prior art documents disclose or envisage dispersants wherein the polyamine or polyimine backbone chain contains different types of polyester side chains. It has now been found that such dispersants exhibit improved dispersion characteristics in both polar and non-polar organic liquids without significant deterioration of dispersion characteristics in the one type of organic liquid.

According to the invention there is provided a dispersant which comprises a polyamine or polyimine backbone chain containing side chains of two or more different types of polyesters chain wherein at least one type of polyester chain is derivable from one or more hydroxy carboxylic acids all of which contain a $C_{1-6}$-alkylene group or lactone thereof and at least one other type of polyester chain derivable from one or more hydroxy carboxylic acids wherein at least one of the hydroxy carboxylic acids contains a $C_{8-30}$-alkylene or $C_{8-30}$-alkenylene group or lactone thereof, including salts of such dispersants. This is referred to hereinafter as The Dispersant.

Preferably the total amount of polyester chains attached to the polyamine or polyimine backbone is from 3:1 to 20:1 more preferably from 5:1 to 20:1, even more preferably from 10:1 to 15:1 and especially from 8:1 to 15:1 by weight of the polyamine or polyimine.

The polyester chain which is derivable from hydroxy carboxylic acids or lactones thereof all of which contain a $C_{1-6}$-alkylene group is a poly(oxy $C_{1-6}$-alkylene carbonyl) chain (hereinafter POAC 1). It may be linear or branched. The POAC 1 chain may be derivable from a single hydroxy carboxylic acid or lactone thereof or from different hydroxy carboxylic acids or lactones thereof.

Preferably, POAC 1 is derivable from hydroxy carboxylic acids or lactones thereof all of which contain a $C_{2-6}$-alkylene group.

Examples of hydroxy carboxylic acids from which POAC 1 may be derived are glycolic acid, 6-hydroxy hexanoic acid and 5-hydroxy pentanoic acid. Examples of suitable lactones are optionally alkyl substituted ε-caprolactone, optionally alkyl substituted δ-valerolactone and β-propriolactone.

When the polyester chain of POAC 1 is branched it may be conveniently derived from alkyl substituted ε-caprolactones. These may be made by oxidation of alkyl substituted cyclohexanone as described in WO 98/19784. Many of these alkyl substituted ε-caprolactones are available as mixtures. The alkyl substituent is preferably $C_{1-6}$-alkyl and especially $C_{1-4}$-alkyl which may be linear or branched. Examples of alkyl substituted ε-caprolactone are 7-methyl, 3-methyl, 5-methyl, 6-methyl, 4-methyl, 5-tert butyl, 4,6,6-trimethyl and 4,4,6-trimethyl substituted ε-caprolactone. An example of an alkyl substituted δ-valerolactone is β-methyl-δ-valerolactone.

When POAC 1 is derivable from a single hydroxy carboxylic acid or lactone thereof it is preferably an alkyl substituted ε-caprolactone and especially ε-caprolactone itself.

However, it is preferred that POAC 1 is derivable from 2 or more different hydroxy carboxylic acids or lactones thereof and especially from two different hydroxy carboxylic acids or lactones thereof. When PAOC 1 is derivable from two different lactones, the lactones are preferably optionally alkyl substituted ε-caprolactone and δ-valerolactone and especially ε-caprolactone and δ-valerolactone. When POAC 1 is derivable from glycolic acid and one or more lactones, the lactone is preferably ε-caprolactone.

The polyester chain which is derivable from one or more hydroxy carboxylic acids at least one of which contains a $C_{8-30}$-alkylene or $C_{8-30}$-alkenylene group, or lactone thereof, is hereinafter referred to as POAC 2. It may be linear or branched and preferably the alkylene or alkenylene group contains not greater than 24 and especially not greater than 20 carbon atoms. It is also preferred that the alkylene or alkenylene group contains not less than 10, more preferably not less than 12 and especially not less than 16 carbon atoms. Examples of suitable hydroxy carboxylic acids from which POAC 2 is derivable are ricinoleic acid, 12-hydroxy stearic acid, 12-hydroxy dodecanoic acid, 5-hydroxy dodecanoic acid, 5-hydroxy decanoic acid and 4-hydroxy decanoic acid.

In one preferred aspect of the invention, POAC 2 is derivable from a single hydroxy carboxylic acid which contains a $C_{8-30}$-alkylene or $C_{8-30}$-alkenylene group such as 12-hydroxy stearic acid or ricinoleic add.

In another preferred aspect of the invention, POAC 2 is derivable from two or more hydroxy carboxylic adds one of which contains a $C_{8-30}$-alkylene or $C_{8-30}$-alkenylene group and at least one hydroxy carboxylic acid which contains a $C_{1-6}$-alkylene group, preferably a $C_{2-6}$-alkylene group, or lactone thereof. Examples of POAC 2 derivable from two different kinds of hydroxy carboxylic acids or lactones thereof are those derivable from ricinoleic acid and optionally alkyl substituted ε-caprolactone and those derivable from ricinoleic acid, optionally alkyl substituted ε-caprolactone and δ-valerolactone. When POAC 2 is derivable from optionally alkyl substituted ∈-caprolactone, the lactone is preferably unsubstituted.

In a particularly preferred class of dispersant, the dispersant contains only two different types of polyester chain, i.e. POAC 1 and POAC 2.

The polyester chains POAC 1 and POAC 2 may be attached to the polyamine or polyimine backbone chains via amide and/or salt linkages or they may be attached via a linkage which contains an ethylenically unsaturated group. In all these methods of attachment, the polyamine is preferably polyallylamine or polyvinylamine and the polyimine is preferably poly ($C_{2-6}$-alkyleneimine) and especially polyethyleneimine. The polyimines may be linear but are preferably branched. Linear polyethyleneimines can be prepared by hydrolysis of poly (N-acyl) alkyleneimines as described, for example, by Takeo Saegusa et al in Macromolecules, 1972, Vol. 5, page 4470. The branched polyethyleneimines of differing molecular weights are commercially available from BASF and Nihon Shokubai. Polyallylamine and poly (N-alkyl) allylamines of differing molecular weights are commercially available from Nitto Boseki. Polyvinylamine of differing molecular weights are available from Mitsubishi Kasel. Poly (propyleneimine) dendrimers are commercially available from DSM Fine Chemicals and poly (amidoamine) dendrimers are available as "Starburst" dendrimers from Aldrich Chemical Co.

In the case where the polyester chains are attached via a linkage containing an ethylenically unsaturated group, the polyamine may also be a diamine which may be aliphate or aromatic. Examples of suitable diamines are ethylenediamine, N,N'-dimethyl ethylenediamine, piperazine, 2-methyl piperazine, 2,5-dimethyl piperazine, 2,3-dimethyl piperazine, 1,4-bis(3-aminopropyl)piperazine, N-(2-aminoethyl)piperazine, isophoronediamine, polyoxy propylenediamine, polyoxy ethylenediamine, bis(4-amino-3-methyl dicyclohexyl)methane, diamino dicyclohexyl methane, bis(aminomethyl)cyclohexane, m-xylylenediamine, ∝-(m-aminomethyl)ethylamine, ∝-(p-aminophenyl)ethylamine, m-phenylenediamine, diaminodiphenyl methane, diaminodiphenyl sulphone and norbomanediamine.

When the polyester chains are attached via a linkage which contains an ethylenically unsaturated group the polyamine or polyimine is preferably polyallylamine, polyvinylamine or poly($C_{2-6}$-alkyleneimine) and especially polyethyleneimine.

The number average molecular weight of the polyamine or polyimine is preferably from 500 to 600,000, more preferably from 1,000 to 200,000, even more preferably from 1,000 to 100,000 and especially from 5,000 to 100,000.

When the dispersant contains only two different types of polyester chain it may be conveniently represented by general formula 1

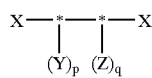

wherein
X-*-*-X represents the polyamine or polyimine backbone polymer;
Y represents a polyester chain residue POAC 1;
is Z represents a polyester chain residue POAC 2;
p and q are integers; and
(p+q) is from 2 to 2000.

Preferably, (p+q) is not less than 4 and especially not less than 10. It is also preferred that (p+q) is not greater than 1000 and especially not greater than 500. The ratio of p:q may vary from 10:1 to 1:10 and preferably from 5:1 to 1:5. It is, however, preferred that the ratio of p:q is from 1:1 to 5:1, i.e., the dispersant contains a greater molar amount of the polyester chain derivable from hydroxycarboxylic acids wherein all the hydroxycarboxylic acids contain an optionally alkyl substituted $C_{2-6}$-alkylene group, or lactones thereof. Particularly useful dispersants have been obtained when the ratio of p:q is 4:1.

When the POAC 1 and POAC 2 residues are linked to the polyamine or polyimine backbone via amide and/or salt linkages, the dispersant may be made by either reacting the polyamine or polyimine with the appropriate hydroxycarboxylic adds or lactones thereof in a stepwise manner or preferably by reacting the polyamine or polyimine with preformed polyesters containing the polyester chain.

When the former, less preferred, method is used the polyamine or polyimine acts as a polymerisation terminating group and the different polyester chains are built sequentially. When the first polyester chain has been built on the polyamine or polyimine backbone the resultant terminal hydroxy group need not be reacted with a polymerisation terminating group in order to prevent the hydroxycarboxylic acids or lactones required for building the second polyester chain from adding to the first polyester chain. However, it is preferred to prepare the precursors containing POAC 1 and POAC 2 chains separately and to subsequently react these precursors with the polyamine or polyimine. The preformed polyester chains, POAC 1 and POAC 2 may be reacted with the polyimine or polyamine either sequentially or, preferably, simultaneously.

It is, of course, possible to use a combination of such methods of preparation wherein one of the polyester chains is built on to the polyamine or polyimine backbone polymer by reacting with the appropriate hydroxycarboxylic acids or lactones thereof and optionally after reacting the terminal hydroxy group of this first polyester chain with a polymerisation terminating compound the polyamine or polyimine containing the first polyester chain is reacted with the second preformed polyester.

As noted hereinbefore, it is preferred to prepare the dispersant by preforming the polyester chains. The preparation of the polyester precursors is most conveniently achieved by reacting the appropriate hydroxycarboxylic acids with a polymerisation terminating compound to give a poly(oxyalkylene carbonyl) chain containing a polymerisation terminating group and/or poly(oxyalkenylene carbonyl) chain containing the is polymerisation terminating group. The polymerisation terminating compound is preferably a carboxylic acid T—COOH which may be aromatic, alicyclic, heterocyclic or preferably aliphatic. The polyester precursor thereby carries a terminal carboxylic acid and may be represented by formula 2

wherein
T is an aromatic, alicyclic, heterocyclic or aliphatic residue all of which may be substituted;
V is the alkylene or alkenylene group of the appropriate polyester chain; and m is from 2to 100.
The polyester acid of formula 2 is hereinafter referred to as a TPOAC acid.
Preferably m is not greater than 70, more preferably not greater than 50 and especially not greater than 20.

When (O—V—CO)$_m$ represents POAC 1 obtainable from two different hydroxycarboxylic acids or lactones thereof, the residue of POAC 1 chain may be conveniently represented by formula 3 in a preferred embodiment of POAC 1

$$—(A)_n(B)_p— \qquad\qquad 3$$

wherein

A represents an oxyalkylene carbonyl chain derivable from optionally alkyl substituted ∈-caprolactone;

B represents an oxyalkylene carbonyl chain derivable from δ-valerolactone;

n and p are integers; and n+p is from 2 to 100.

Preferably (n+p) is not greater than 70, more preferably not greater than 50 and especially not greater than 20.

The ratio of n:p is preferably between 12:1 and 1:6, more preferably between 8:1 and 1:2 and especially between 6:1 and 1:2.

When (O—V—CO)$_m$ represents POAC 2 which is derivable from two different types of hydroxycarboxylic acids or lactones thereof, the residue of POAC2 chain may be conveniently represented by formula 4 in a preferred embodiment of POAC 2

$$—(A)_q(D)_r— \qquad\qquad 4$$

wherein

A represents an oxyalkylene carbonyl chain derivable from optionally alkyl substituted 6-hydroxyhexanoic acid or ∈-caprolactone;

D represents an oxy (C$_{8-30}$)-alkylene carbonyl chain and/or an oxy (C$_{8-30}$)-alkenylene carbonyl chain;

q and r are integers; and q+r is from 2 to 100.

Preferably (q+r) is not greater than 70, more preferably not greater than 50 and especially not greater than 20.

The ratio of q:r is preferably between 4:1 and 1:4 and especially between 2:1 and 1:2.

The polymerisation terminating acid T—COOH is preferably free from amino groups and is preferably a C$_{1-25}$-aliphatic carboxylic acid which may be linear or branched and is optionally substituted by hydroxy, C$_{1-4}$-alkoxy or halogen. The residue T may be saturated or unsaturated and preferably contains not greater than 18 carbon atoms. Examples of suitable carboxylic acids T—COOH are glycolic, lactic, caproic, lauric, oleic, linoleic, stearic, methoxy acetic, ricinoleic, 12-hydroxy stearic, 12-hydroxy dodecanoic, 5-hydroxy dodecanoic, 5-hydroxy decanoic, 4-hydroxy decanoic, isobutyric, 2-ethylbutyric, isovaleric; 2,2-dimethylbutyric, 2-methylvaleric, 2-propylpentanoic, 2-ethylhexanoic acids and C$_{12-24}$-branched chain aliphatic acids available as Isocarbs from Condea.

Many of the hydroxycarboxylic acids which are used to prepare the polyester chains are available commercially as mixtures which contain a carboxylic acid which is free from hydroxy groups. The carboxylic acid which is free from hydroxy groups can, thereby, act as the polymerisation terminating group, e.g. commercially available 12-hydroxy stearic acid often contains some stearic acid.

As noted hereinbefore the polyester chains may also be attached to the polyamine or polyimine backbone chain via an ethylenically unsaturated group, for example, using a Michaels addition reaction. In this instance the polyester chain may carry a polymerisation terminating group which is attached to either the terminal hydroxy group of the polyester chain or to the carboxylic acid group of the polyester chain. The polymerisation terminating group can contain the ethylenically unsaturated group or the ethylenically unsaturated group may be attached to the polyester chain via either the free hydroxyl or free carboxylic acid group when the polymerisation terminating group does not contain the ethylenically unsaturated group.

In one preferred aspect of the invention, the polyester containing an ethylenically unsaturated group is of formula 5

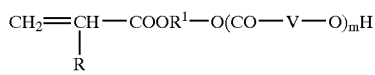

wherein

R is hydrogen or C$_{1-4}$-alkyl;

R$^1$ is an aliphatic or aromatic residue containing up to 10 carbon atoms which optionally contains a polyether group derivable from propylene oxide and/or ethylene oxide; and V and m are as defined hereinbefore.

The compounds of formula 5 may be conveniently prepared by reacting an (alk) acrylic acid carrying a terminal hydroxy group with the appropriate hydroxy carboxylic acid or lactone thereof to build the chain residue represented by (CO—V—O)$_m$. In this instance the (alk) acrylic acid acts as the polymerisation terminating group.

Preferably, R is either hydrogen or methyl.

Examples of suitable (alk) acrylic acids containing a terminal hydroxy group are hydroxy ethyl (meth) acrylic acid, hydroxy propyl (meth) acrylic acid, hydroxy butyl (meth) acrylic acid, polyethyleneglycol mono (meth) acrylate, poly propyleneglycol mono (meth) acrylate, polyethyleneglycol—polypropyleneglycol mono (meth) acrylate, polyethyleneglycol—polytetramethylene glycol mono (meth) acrylate and poly propyleneglycol—polytetramethyleneglycol mono (meth) acrylate (e.g. Blemmer PE, Blemmer PP ex Nihon Yushi Co. Ltd.).

The dispersants according to the present invention may be prepared by any means known to the art. Thus, where the polyesters are attached to the polyamine or polyimine backbone chain via amide and/or salt linkages the polyesters are preferably reacted with the polyamine or polyimine by heating at temperatures between 50° C. and 250° C., preferably in an inert atmosphere. Preferably the temperature is not less than 80° C. and especially not less than 100° C. In order to minimise charring of the dispersant, the temperature is preferably not greater than 150° C.

The inert atmosphere may be provided by any gas which does not react with the dispersant or the starting materials and includes the inert gases of the Periodic Table and especially nitrogen.

When the dispersant containing amide and/or salt linkages is prepared in a single stage by reacting the polyamine or polyimine with the appropriate polymerisation terminating compound, hydroxycarboxylic acids or lactones thereof it is preferred to include an esterification catalyst such as tetra-alkyl titanate, for example tetra butyl titanate, zinc salt of an organic acid, for example zinc acetate, zirconium salt of an aliphatic alcohol, for example zirconium isopropoxide, aryl sulphonic acid, for example toluene sulphonic add, or a strong organic acid such as halo acetic acid, for example trifluoroacetic acid. Zirconium isopropoxide is preferred. When the dispersant is prepared by a single stage process, higher temperatures may be required and these are typically from 150° C. to 180° C.

As noted hereinbefore it is preferred to prepare the polyester chains or TPOAC acids separately, prior to reacting them with the polyamine or polyimine. In this case, the hydroxycarboxylic acids or lactones thereof and polymerisation terminating compound are reacted together in an inert atmosphere at 150–180° C. and preferably in the presence of an esterification catalyst. The subsequent reaction with the polyamine or polyimine may then be carried out at 100–150° C.

Typical conditions for preparing the dispersants containing amide and/or salt linkages are as described in WO 94/21368 and WO 98/19784.

The compounds of formula 5 may be conveniently prepared by reacting the (alk) acylic acid containing a terminal hydroxy group with the relevant hydroxycarboxylic acids or lactones thereof at from 50° C. to 150° C. preferably from 80° C. to 120° C. in the presence of air and oxygen. Preferably the reaction is carried out in the presence of an esterification catalyst such as tetra alkyl titanate, for example tetra butyl titanate, a metal alkoxide such as tetra isopropyl titanate, a tin catalyst such as stannous chloride, stannous octylate or mono butyl tinoxide or an acid catalyst such as p-toluene sulphonic acid or trifluoro acetic acid. The reaction is also preferably carried out in the presence of a polymerisation inhibitor to prevent the self-polymerisation of the (alk) acrylic acid containing the terminal hydroxy group. Examples of suitable inhibitors are (methyl) hydroquinone, phenothiazine and air (oxygen).

The reaction between the polyamine or polyimine and the compound of formula 5 is preferably carried out between 10° C. and 130° C., especially between 20° C. and 100° C. and preferably in an inert solvent. Examples of suitable inert solvents are aromatic and aliphatic solvents such as xylene, toluene and Solvesso, ketones such as acetone, methylethylketone and methylisobutylketone, alkanols such as n-butanol and isopropanol and esters such as dimethyladipate, dimethylsuccinate and dimethylglutarate.

The dispersants according to the invention may also contain polyoxyalkylene carbonyl chains or polyoxyalkenylene carbonyl chains which are attached to the polyamine or polyimine by different linking mechanisms, for example, polyoxyalkylene carbonyl or polyoxyalkenylene carbonyl chains linked to the polyamine or polyimine via amide and/or salt linkages and polyoxyalkylene carbonyl chains or polyoxyalkenylene carbonyl chains linked to the polyamine or polyimine via an ethylenically unsaturated group.

When The Dispersant contains free amino or imino groups these may be converted into substituted ammonium groups by reaction with an acid or quaternising agent so that The Dispersant is in the form of a substituted ammonium salt. Suitable reagents for this purpose are mineral and strong organic acids or acidic alts such as acetic acid, sulphuric acid, alkyl sulphonic acids, alkyl hydrogen sulphates and aryl sulphonic acids including acid forms of dyestuffs and pigments (i.e. coloured acids) and quaternising agents such as dialkyl sulphates, for example, dimethyl sulphate and alkyl halides, such as methyl and ethyl chloride.

The term 'coloured acid' means an organic pigment or dyestuff containing at least one, preferably from 1 to 6 acid groups, especially sulphonic, phosphoric or carboxylic acid groups. A preferred coloured acid is copper phthalocyanine or other deeply coloured pigment and especially sulphonated copper phthalocyanine containing, on average, from 0.5 to 3 sulphonic acid groups per molecule.

Where the polyester chains are attached to the polyimine or polyamine via amide or salt linkages, useful dispersants have been obtained where POAC 2 is obtainable from poly(12-hydroxy stearic acid) optionally end-capped by stearic acid or poly (ricinoleic acid) optionally end capped by oleic and/or linoleic acid, especially where the number average molecular weight is between 1000 and 2400, for example between 1200 and 2000. Useful dispersants have also been obtained where POAC 2 is obtainable from ricinoleic acid and ∈-caprolactone in the molar ratio of from 4:1 to 1:4, especially from 2:1 to 1:2 and especially where the number average molecular weight is from 1000 to 2400, for example between 1200 and 2000. These dispersants which have been found particularly useful also contain the residue of a POAC 1 polyester which is either ∈-caprolactone optionally end-capped with lauric acid or a polyester obtainable from lauric acid, ∈-caprolactone and δ-valerolactone and which preferably have a number average molecular weight between 1000 and 2400, for example between 1200 and 2000. Dispersants wherein the molar ratio of lauric acid to other lactone(s) is from 1:10 to 1:20 have been found especially useful. Where POAC 1 is derivable from ∈-caprolactone and δ-valerolactone, dispersants have been found particularly useful which contain a molar ratio of ∈-caprolactone to δ-valerolactone of from 1:1 to 6:1. In these particularly useful dispersants the molar ratio of POAC 1 to POAC 2 is from 2:1 to 4:1 and the amount of amine/imine groups reacted with POAC 1 and POAC 2 is, together, from 40 to 60%, by weight of the primary and secondary amine groups which are available for reaction with the polyester chains.

As noted hereinbefore, The Dispersant is particularly useful for dispersing a particulate solid in an organic medium which may be either polar or non-polar.

According to a further aspect of the invention there is provided a composition comprising a particulate solid and The Dispersant.

According to a still further aspect of the invention there is provided a dispersion comprising The Dispersant, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aliphatic or aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as heptane, octane and decane, petroleum distillates such as white spirits and halogenated aliphatic and aromatic hydrocarbons, such as trichloro-ethylene, perchloroethylene, chlorobenzene and dichlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins are short, medium and long oil length alkyd resins, alkyd/melamine formaldehyde, alkyd/urea-formaldehyde, alkyd/urea-formaldehyde acid cured, base coat acrylic/cellulose acetate butyrate/melamine-formaldehyde, polyester/melamine-formaldehyde, base coat polyester/cellulose acetate butyrate/melamine-formaldehyde, base coat nitrocellulose, epoxy, epoxy/amine cured, hydroxy acrylic/isocyanate cured, nitrocellulose and wood stains, polyesters, polyurethane 2-pack, silicone modified polyesters, thermoplastic acrylics, thermo setting acrylics, thermo setting acrylic/melamine-formaldehyde, urethane, vinyl acetate/PVC copolymers and multi media resins such as acrylic and urea aldehyde.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and The Dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or The Dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of The Dispersant and the particulate solid, it preferably contains at least 0.2%, more preferably at least 0.5% and especially at least 1.0% of The Dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, The Dispersant is particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, The Dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of The Dispersant in the mill-base is dependent on the amount of particulate solid but is preferably from 0.5 to 5% by weight of the mill-base.

Dispersions and mill bases containing The Dispersant are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over similar known is dispersants which contain only the one type of polyester chain. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4–10° C. When incorporated into paints and painting inks, The Dispersant gives rise to higher gloss readings and lower haze values in the resultant paints and inks. The Dispersants also exhibit reduced flocculation in multi media tinter paints and inks.

The invention is further illustrated by the following examples wherein all references to amounts are in parts by weight unless indicated to the contrary.

EXAMPLE 1 a) Preparation of Polyester 1

Ricinoleic acid (500 parts, 1.68 M ex Fisher) and zirconium-n-butoxide (2.5 parts) were stirred at 170° C. under nitrogen until the number average molecular weight was between 1500 and 1800 and the acid value of the polyester was about 35 mg KOH/gm. The water produced in the reaction was removed by means of a Dean-Stark equipment. This is Polyester 1.

b) Preparation of Polyester 2 (LA 1, ∈-cap 12, δ-val 3)

Lauric acid (45 parts, 0.225 M ex Aldrich), ∈-caprolactone (307.6 parts, 2.7 M ex Aldrich), δ-valerolactone (67.5 parts, 0.675 M ex Aldrich) and zirconium-n-butoxide (10.5 parts) were stirred under nitrogen at 170° C. until the number average nolecular weight was between 1500 and 1800 and the acid value of the polyester was about 30 mgs KOH/gm. This is Polyester 2.

c) Preparation of Dispersant

Polyester 1 (80 parts) and Polyester 2 (350.2 parts) were stirred under nitrogen at 60° C. Polyethyleneimine (29.59 parts SP200 ex Nippon Shokubai) was added and the reactants stirred at 120° C. under nitrogen for 18 hours until the acid value of the dispersant was 20 mg KOH/gm with a base equivalent of 1550. On cooling, the product was obtained as a yellow semi-solid. This is Dispersant 1. The molar ratio of Polyester 1 to Polyester 2 is 1:4 and the polyethyleneimine backbone chain contains polyester chains attached by 35.5% salt linkages and 38.3% amide linkages.

EXAMPLE 2

A millbase was prepared by milling together transparent red iron oxide pigment (49.13 parts, Bayferrox Red 130M ex Bayer), dispersant (1.22 parts), aldehyde/urea film-forming resin (14.87 parts, Laropal A-81 as 60% (w/w) solution in methoxy propyl acetate) and methoxy propyl acetate (4.97 parts). The milling was carried out on a Skandex bead mill for 30 minutes using 3 mm diameter glass beads (125 parts). After removing the glass beads, the above millbase (1 part) was stirred into a white base paint containing titanium dioxide pigment (10 parts).

The white base paint containing the red tinter was coated onto a card using a K-proofer and number 6 K-bar to give a paint film thickness of 60μ. A drop of the paint formulation was then applied to the paint film and rubbed into the surface using finger pressure until the paint film became tacky. It was then dried at 25° C. for 4 hours.

The L, a, b colour co-ordinates were then measured for the rubbed area and also the area of paint film to which no additional paint had been applied. The difference between these two sets of measurements (ΔE) gives a measure of acceptance of the universal tinter (red oxide pigment) by the white base paint $$\Delta E = \overline{\sqrt{(\Delta L)^2 + (\Delta a)^2 + (\Delta b)^b}}$$

$\Delta L$ is $L_1-L_2$, $\Delta a$ is $a_1-a_2$ and $\Delta b$ is $b_1-b_2$ where subscript 1 relates to the paint film to which no additional paint was applied and subscript to 2 refers to the paint film to which additional paint was applied followed by finger rubbing.

A comparison of the dispersion characteristics for Dispersant 1 and a 50/50 (w/w) mixture of Dispersant A (1:1 molar ratio of ricinoleic acid and ∈-caprolactone reacted with polyethyleneimine (MW 10,000) in 13:1 (w/w) ratio) and Dispersant B (polyester from lauric acid, ∈-caprolactone and δ-valerolactone (1:12:3 molar ratio) reacted with polyethyleneimine (MW 10,000) in 13:1 (w/w) ratio) for different white base paints is given in Table 1 below.

These results indicate the universal nature of Dispersant 1.

TABLE 1

| | White-base paint | | | | | | | |
|---|---|---|---|---|---|---|---|---|
| | Epoxy | | Air-dried alkyd | | Acrylic | | Polyurethane | |
| | Strength | ΔE | Strength | ΔE | Strength | ΔE | Strength | ΔE |
| Dispersant 1 | 99.31 | 0.37 | 97.08 | 2.74 | 120.2 | 0.57 | 102.3 | 1.09 |
| Control | 100 | 1.49 | 100 | 2.89 | 100 | 3.71 | 100 | 1.92 |

Footnote to Table 1
Epoxy base paint is Epilife White ex Marcel Guest.
Air-dried alkyd is ex CIN, Portugal.
Acrylic is Acrythane White ex Marcel Guest.
Polyurethane is Standathane White ex Marcel Guest.

Preparation of Polyesters Intermediates (POAC1)

Example 1(b) was repeated to give the polyester listed in Table 2 below wherein the numerical values indicate the molar ratios of the components.

TABLE 2

| Polyester | Structure of POAC 1 |
| --- | --- |
| 3 | lauric:cap (1:12) |
| 4 | lauric:cap:val (1:9:4) |
| 5 | lauric:cap:glycolic (1:10:3) |
| 6 | methoxyacetic:cap:5-Mecap (1:11:2) |
| 7 | methoxyacetic:cap:4-Mecap (1:12:2) |

Footnote to Table 2.
Lauric is lauric acid
cap is ε-caprolactone
val is δ-valerolactone
glycolic is glycolic acid
methoxy acetic is methoxyacetic acid
5-Mecap is 5-methyl-ε-caprolactone
4-Mecap is 4-methyl-ε-caprolactone
The preparation of 4-Mecap and 5-Mecap is describe in WO 98/19784.

Preparation of Acrylate (POAC 1) HEA (1), cap (10), val (3)

2-Hydroxyethyl acrylate (33.58 parts, 0.29M ex Aldrich), ε-caprolactone (329.9 parts, 2.89M ex Solvay Interox) and δ-valerolactone (86.6 parts, 0.86M ex BASF) were stirred together at 65° C. for 72 hours in the presence of methylhydroquinone (0.06 parts ex Aldrich) and tin (II) 2-ethylhexanoate (0.6 parts ex Aldrich) whilst passing air through the reactants. After cooling, the product was obtained as a pale yellow oil. This is Polyester 8.

Preparation of Polyester Intermediates (POAC 2)

Preparation of PHS (MW 1600) (POAC 2)

Xylene (348 parts) and 12-hydroxystearic acid (3350 parts having acid and hydroxy values of 182 mg KOH/gm and 160 mg KOH/gm, respectively) were stirred together for 22 hours at 190–200° C. in a reactor equipped with a Dean and Stark collector. After 152 parts water had been removed the xylene was removed at 200° C. under nitrogen. On cooling, the intermediate was obtained as a pale amber liquid having an acid value of 35 mg KOH/gm. This is Polyester 9.

Preparation of SA End-capped PHS (POAC 2)

Polyester 9 (353 parts) and stearic acid (33.62 parts ex Aldrich) were stirred together at 190° C. for 18 hours under nitrogen in the presence of zirconium n-butoxide (0.23% w/w ex Aldrich). After cooling, the fully end-capped polyester was obtained as a pale yellow oil having an acid value of 27 mg KOH/g. This is Polyester 10.

Preparation of cap:ric (5:1) (POAC 2)

Ricinoleic acid (150 parts ex Akzo) and ε-caprolactone (286.2 parts ex Solway Interox) were stirred under nitrogen for 5 hours at 170° C. in the presence of zirconium n-butoxide (0.5% by weight). After cooling, the product was obtained as a yellow oil having an acid value of 37 mg KOH/g. This is Polyester 11.

EXAMPLES 3 TO 16

Preparation of Dispersants

Example 1(c) was repeated to give the dispersants listed in Table 3 below by using the polyesters and polyethyleneimines indicated in the table.

TABLE 3

| | | POAC 1 | | POAC 2 | | Molar ratio of | PEI | Amount | Ratio of Polyester:PEI |
| --- | --- | --- | --- | --- | --- | --- | --- | --- | --- |
| Example | Dispersant | Polyester | Amount | Polyester | Amount | POAC1:POAC2 | (Mn) | of PEI | ($^w/_w$) |
| 3 | 2 | 2 | 350.2 | 1 | 80 | 4:1 | 10,000 | 29.59 | 14.5:1 |
| 4 | 3 | 2 | 324 | 1 | 100 | 3:1 | 10,000 | 30.4 | 13.9:1 |
| 5 | 4 | 2 | 258.6 | 1 | 130 | 2:1 | 10,000 | 109.7 | 3.5:1 |
| 6 | 5 | 2 | 344.4 | 1 | 80 | 4:1 | 1,200 | 29.3 | 14.5:1 |
| 7 | 6 | 2 | 346.5 | 1 | 80 | 4:1 | 5,000 | 28.8 | 14.8:1 |
| 8 | 7 | 2 | 343.8 | 1 | 80 | 4:1 | 25,000 | 28.3 | 14.9:1 |
| 9 | 8 | 2 | 264.7 | 1 | 132.4 | 2:1 | 10,000 | 30 | 13:1 |
| 10 | *9 | 3 | 248.3 | 1 | 119.8 | 2:1 | 10,000 | 30.1 | 12.3:1 |
| 11 | 10 | 3 | 248.3 | 1 | 119.8 | 2:1 | 10,000 | 30.1 | 12.3:1 |
| 12 | 11 | 4 | 338 | 9 | 55 | 6:1 | 10,000 | 23.4 | 17:1 |
| 13 | 12 | 5 | 317.7 | 9 | 46.3 | 9:1 | 5,000 | 36.8 | 10:1 |
| 14 | 13 | 4 | 300.9 | 10 | 53.2 | 6:1 | 5,000 | 35.3 | 10:1 |
| 15 | 14 | 6 | 135.1 | 11 | 39.4 | 3:1 | 1,200 | 30 | 6:1 |
| 16 | 15 | 8 | 54.3 | 11 | 212.8 | 4:1 | 1,200 | — | 17:1 |

Footnote to Table 3
*The preparation of Dispersant 9 was terminated after 3 hours

EXAMPLE 17

Preparation of Polyester 7/Polyester 11/PAA

Polyester 7 (248 parts) and Polyester 11 (53.4 parts) were stirred under nitrogen at 130° C. Polyallylamine (177.6 parts as a 10% w/w solution in water, Mn 20,000 ex Nitto Boseki) was added dropwise over 4 hours at 130° C. and the water removed from the reactants by stirring under a nitrogen stream at 130° C. for 16 hours. The product was obtained as a yellow oil wherein the molar ratio of Polyester 7 to Polyester 11 is 4:1 and the weight ratio of Polyester 7 and Polyester 11 to polyallylamine is 17:1. This is Dispersant 16.

EXAMPLE 18 TO 32

Dispersants 3 to 16 were evaluated in acrylic and polyurethane paints as described in Example 2. The results are given in Table 4 below which clearly show that the dispersants according to the invention exhibit much superior acceptance levels of the universal tinter (ΔE values) compared with dispersants prepared from a single polyester chain or a mixture of such dispersants.

TABLE 4

|  |  | White Base Paint | | | |
|---|---|---|---|---|---|
|  |  | Acrylic | | Polyurethane | |
| Example | Dispersant | Strength | ΔE | Strength | ΔE |
| 18 | 2 | 165 | 1.03 | 116 | 1.03 |
| 19 | 3 | 103 | 2.71 | 104 | 0.63 |
| 20 | 4 | 158 | 0.84 | 87 | 2.88 |
| 21 | 5 | 172 | 1.24 | 118 | 1.29 |
| 22 | 6 | 157 | 0.83 | 123 | 0.78 |
| 23 | 7 | 147 | 1.56 | 121 | 1.23 |
| 24 | 8 | 94 | 1.93 | 98 | 2.5 |
| 25 | 9 | 100 | 0.72 | 94 | 2.36 |
| 26 | 10 | 90 | 0.76 | 91 | 2.59 |
| 27 | 11 | 100 | 0.45 | 109 | 1.4 |
| 28 | 12 | 103 | 0.65 | 93 | 2.54 |
| 29 | 13 | 105 | 0.59 | 96 | 1.87 |
| 30 | 14 | 115 | 0.5 | 108 | 0.83 |
| 31 | 15 | 105 | 0.9 | 109 | 0.82 |
| 32 | 16 | 108 | 0.48 | 104 | 0.85 |
| Control | A | 100 | 8.35 | 100 | 6.23 |
| Control | A/B | 138 | 4.14 | 108 | 2.87 |

Footnote to Table 3
Dispersant A is as described in Example 2. Dispersant A/B is a 50/50 $^w/_w$ mixture of Dispersant A and Dispersant 3 as described in Example 2.

What is claimed is:

1. A dispersant which comprises a polyamine or polyimine backbone chain containing side chains of two or more different types of polyester chain wherein at least one type of polyester chain is derivable from one or more hydroxy carboxylic acids all of which contain a $C_{1-8}$-alkylene group or lactone thereof and at least one other type of polyester chain derivable from one or more hydroxy carboxylic acids wherein at least one of the hydroxy caboxylic acids contains a $C_{8-30}$-alkylene or $C_{8-30}$-alkenylene chain or lactone thereof, including salts of such dispersants.

2. A dispersant as claimed in claim 1 which contains side chains from two different types of polyester chain.

3. A dispersant as claimed in claim 1 wherein the polyester chain containing $C_{1-6}$-alkylene groups is derivable from optionally alkyl substituted ∈-caprolactone and δ-valerolactone.

4. A dispersant as claimed in claim 1 wherein the $C_{8-30}$-alkenylene chain is derivable from ricinoleic acid.

5. A dispersant as claimed in claim 1 wherein the polyester chains are attached to the polyamine or polyimine backbone via amide and/or salt linkages.

6. A dispersant as claimed in claim 1 wherein the polyimine is poly ($C_{2-6}$-alkyleneimine).

7. A dispersant as claimed in claim 6 wherein the polyimine is polyethyleneimine.

8. A dispersant as claimed in claim 1 wherein the number average molecular weight of the polyamine or polyimine is from 500 to 600,000.

9. A dispersant as claimed in claim 2 which is represented by formula 1

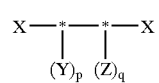

wherein

X-*-*-X represents the polyamine or polyimine backbone polymer;

Y is the residue of a polyester chain which is derivable from one or more hydroxy carboxylic acids all of which contain a $C_{1-6}$-alkylene group or lactones thereof;

Z is the residue of a polyester chain which is derivable from one or more hydroxy carboxylic acids at least one of which contains a $C_{8-30}$-alkylene or $C_{8-30}$-alkenylene group or lactones thereof;

p and q are integers; and (p+q) is from 2 to 2000.

10. A dispersant as claimed in claim 9 wherein the ratio of p to q is from 1:10 to 10:1.

11. A dispersant as claimed in claim 9 wherein the ratio of p to q is from 1:1 to 5:1.

12. A dispersant as claimed in claim 9 wherein Y is the residue of a polyester chain derivable from lauric acid, ∈-caprolactone and δ-valerolactone.

13. A dispersant as claimed in claim 12 wherein the molar ratio of ∈-caprolactone to δ-valerolactone is from 2:1 to 6:1.

14. A dispersant as claimed in claim 9 wherein Z is the residue of poly(ricinoleic acid).

15. A composition comprising a particulate solid and a dispersant as claimed in claim 1.

16. A composition comprising an organic medium and a dispersant as claimed in claim 1.

17. A dispersion comprising a particulate solid, an organic medium and a dispersant as claimed in claim 1.

18. A millbase comprising a particulate solid, a film-forming resin, an organic medium and a dispersant as claimed in claim 1.

19. A paint or printing ink comprising a particulate solid, a film-forming resin, an organic medium and a dispersant as claimed in claim 1.

* * * * *